United States Patent [19]

Heckman

[11] Patent Number: 5,421,211
[45] Date of Patent: Jun. 6, 1995

[54] LIQUID FLOWMETER INCLUDING DOPPLER SIGNAL PROCESSING, AND METHOD

[75] Inventor: Donald B. Heckman, Purcellville, Va.

[73] Assignee: Marsh - McBirney, Inc., Frederick, Md.

[21] Appl. No.: 321,023

[22] Filed: Oct. 6, 1994

[51] Int. Cl.$^6$ .............................................. G01F 1/00
[52] U.S. Cl. .............................. 73/861.25; 73/861.23
[58] Field of Search ................ 73/629, 861.25, 861.26; 128/661.07, 661.09

[56] References Cited

U.S. PATENT DOCUMENTS

| | | | |
|---|---|---|---|
| 2,972,068 | 2/1961 | Howry et al. | 310/8.2 |
| 3,403,271 | 9/1968 | Lobdell et al. | 310/8.2 |
| 3,675,192 | 7/1972 | Fahrbach | 73/861.25 |
| 4,048,853 | 9/1977 | Smith et al. | 73/194 A |
| 4,067,236 | 1/1978 | Hottinger | 73/194 A |
| 4,540,946 | 9/1985 | Sainz et al. | 328/167 |
| 4,579,005 | 4/1986 | Brown | 73/861.25 |
| 4,790,323 | 12/1988 | Leavitt et al. | 128/661.09 |
| 4,866,613 | 9/1989 | Amemiya et al. | 364/413.25 |
| 4,989,609 | 2/1991 | Smith et al. | 128/661.08 |
| 5,020,374 | 6/1991 | Petroff et al. | 73/861.25 |
| 5,046,500 | 9/1991 | Fehr | 128/661.09 |
| 5,198,989 | 3/1993 | Petroff | 364/510 |
| 5,228,009 | 7/1993 | Forestieri et al. | 128/661.09 |
| 5,299,174 | 3/1994 | Forestieri et al. | 128/661.09 |

OTHER PUBLICATIONS

Peter Atkinson and John P. Woodcock, Doppler Ultrasound and its Use in Clinical Measurement, 1982, pp. 116–125.

Primary Examiner—Richard E. Chilcot, Jr.
Assistant Examiner—R. Biegel
Attorney, Agent, or Firm—Laubscher & Laubscher

[57] ABSTRACT

A liquid flowmeter and method for determining the velocity of flow of fluid in a conduit, including a sensor adapted for mounting in the bottom of the conduit, and including acoustic energy transmitting and receiving devices, an in-phase reflected Doppler energy signal detector connected with the receiving device, an anti-alias low pass filter for producing from the in-phase reflected energy a filtered signal, a digital-to-analog converter for digitalizing the in-phase signal to produce a sampled array, an accumulator for storing a first number (M) of mean zeroed power spectra from the sampled array, a zeroing device for zeroing a second number (K) of the initial samples of the power spectra, thereby to produce a first modified spectra, a median filter of rank R for filtering the first modified spectra to produce a second modified spectra, a limiting device for limiting the second modified spectra to produce samples limited to the upper portion of a range of amplitudes, thereby to produce a third modified spectra, a device for determining the high-frequency edge of the third modified spectra, a first converting device operable when the third modified spectra have a wide band width for producing as a multiple of the high-frequency edge an estimate of mean fluid velocity, and a second converting device operable when the third modified spectra have a narrow band width for producing as a function of the spectral peak an estimate of mean fluid velocity.

8 Claims, 9 Drawing Sheets

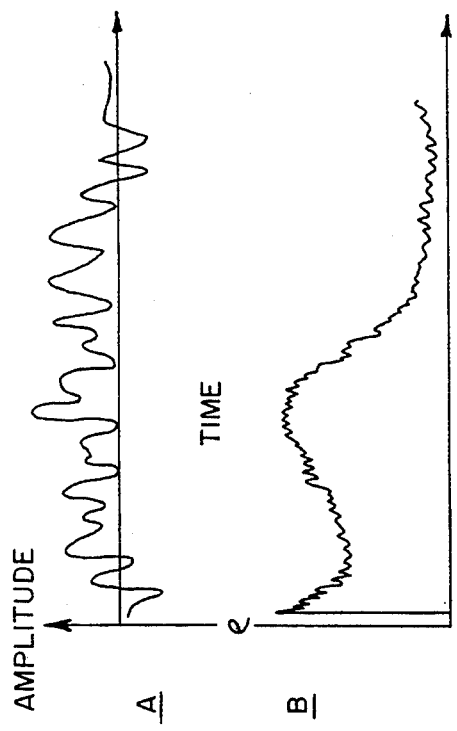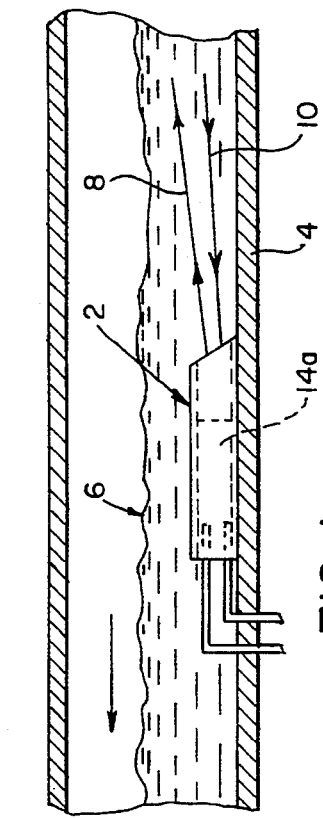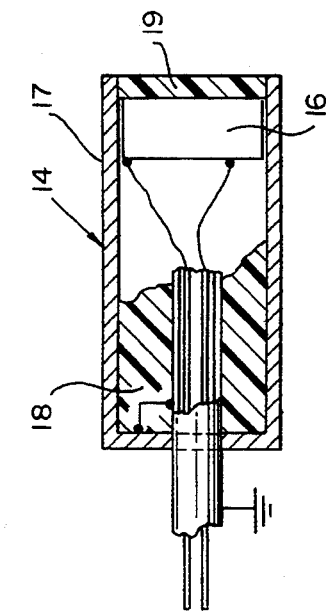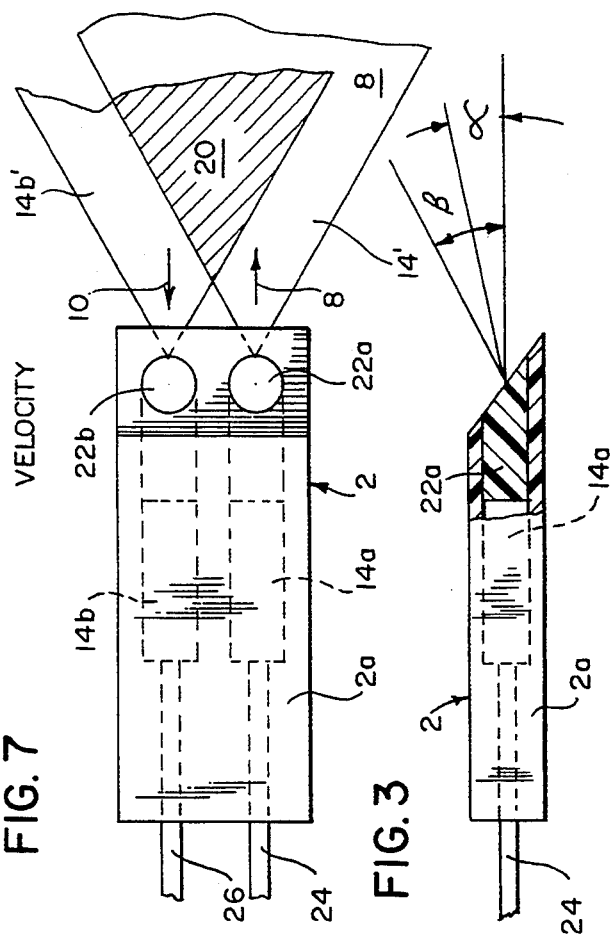

DECIMATED ARRAY

SAMPLES

CELL RATIO ARRAY

DECIMATED ARRAY

CELL RATIO ARRAY

Decimated Array

Cell Ratio Array

Decimated Array

Cell Ratio Array

LIQUID FLOWMETER INCLUDING DOPPLER SIGNAL PROCESSING, AND METHOD

STATEMENT OF THE INVENTION

This invention relates to a method and apparatus for measuring the flow of a fluid, such as sewage, through a conduit, use being made of reflected acoustic energy for measuring the velocity of fluid flow, characterized in that the reflected in-phase Doppler signal is filtered by an anti-alias filter and converted to a digital signal that is filtered at a given sampling rate to produce a sampled array, whereupon a given first number of mean-zeroed power spectra are obtained from the sampled array. A second number of the samples of the power spectra are zeroed to produce a first modified spectra that is passed through a median filter of rank R, thereby to produce a second modified spectra that is limited to produce a third modified spectra the high frequency edge of which is analyzed to determine whether the third modified spectra has a narrow or a wide band width. Based on this determination, the third modified spectra are converted to produce an estimate of mean velocity.

BRIEF DESCRIPTION OF THE PRIOR ART

It is known in the patented prior art to use the acoustic energy reflected by a fluid to determine the flow velocity of the fluid. In the Petrof et al U.S. Pat. Nos. 5,020,374 and 5,198,989, the energy reflected by fluid in a conduit serves as a means for determining flow velocity. In U.S. Pat. No. 5,020,374, the highest Doppler signal is determined by the fast Fourier transform processing of a succession of samples which are sampled after discarding the extremes. In the treatise "Doppler Ultrasound and its Use in Clinical Measurement" by Peter Atkinson and John P. Woodcock, Academic Press, 1982 a disclosure is presented of peak-frequency followers which are combined with spectrum analyzers to produce time-saving methods for processing Doppler signals. Other Doppler systems for measuring fluid flow as set forth in the patents to Smith U.S. Pat. No. 4,048,853, Nottinger U.S. Pat. No. 4,067,236 and Brown U.S. Pat. No. 4,579,005, among others.

The present invention was developed to provide an improved flowmeter of the reflected Doppler energy type that avoids the drawbacks of the systems of the prior art, and which produces flow measurements with increased accuracy by means of simple signal processing.

SUMMARY OF THE INVENTION

Accordingly, a primary object of the present invention is to provide an improved flowmeter system and method in which the reflected in-phase Doppler energy is filtered, digitalized to produce a time sequence of N samples, and sampled to produce a sampled array a first number (M) of which are accumulated as mean-zeroed power spectra, and a second number (K) of which are zeroed to produce first modified spectra that are passed through a median filter of a given rank (R), thereby to produce a second modified spectra which are limited to the upper portion of a range of amplitudes, thereby to produce a third modified spectra the high-frequency edge of which is determined, whereupon the third modified spectra is converted to produce an estimate of mean velocity in a manner depending on whether the third modified spectra has a narrow band width or a wide band width.

According to another object of the invention, sensor means are provided for insertion within the flow path to transmit acoustic energy into the fluid, and to receive the reflected Doppler energy returned to the sensor. The sensor has a flat inclined end face that contains the transmitter and receiver devices, respectively.

According to a further object of the invention, median filter means are provided for use in combination with dynamic range limitation of the Doppler spectra. The high-frequency edge is detected in combination with the determination of narrow or wide bandwidth to produce a mean velocity estimate based on either the high frequency edge of the frequency or the spectral peak. If desired, either of the high frequency edge or the frequency of the spectral peak may be modified by the liquid depth when normalized by conduit size.

BRIEF DESCRIPTION OF THE DRAWINGS

Other objects and advantages of the invention will become apparent from a study of the following specification, when viewed in the light of the accompanying drawings, in which:

FIG. 1 is a diagrammatic illustration of the Doppler transmitter-receiver sensor of the flowmeter of the present invention mounted within a partially filled liquid conduit;

FIG. 2 is a sectional view of a transducer according to the present invention;

FIGS. 3 and 4 are top plan and side elevational views of the Doppler sensor of FIG. 1;

FIG. 7 illustrates two waveforms produced during the Doppler signal processing;

DETAILED DESCRIPTION

Figure 5:
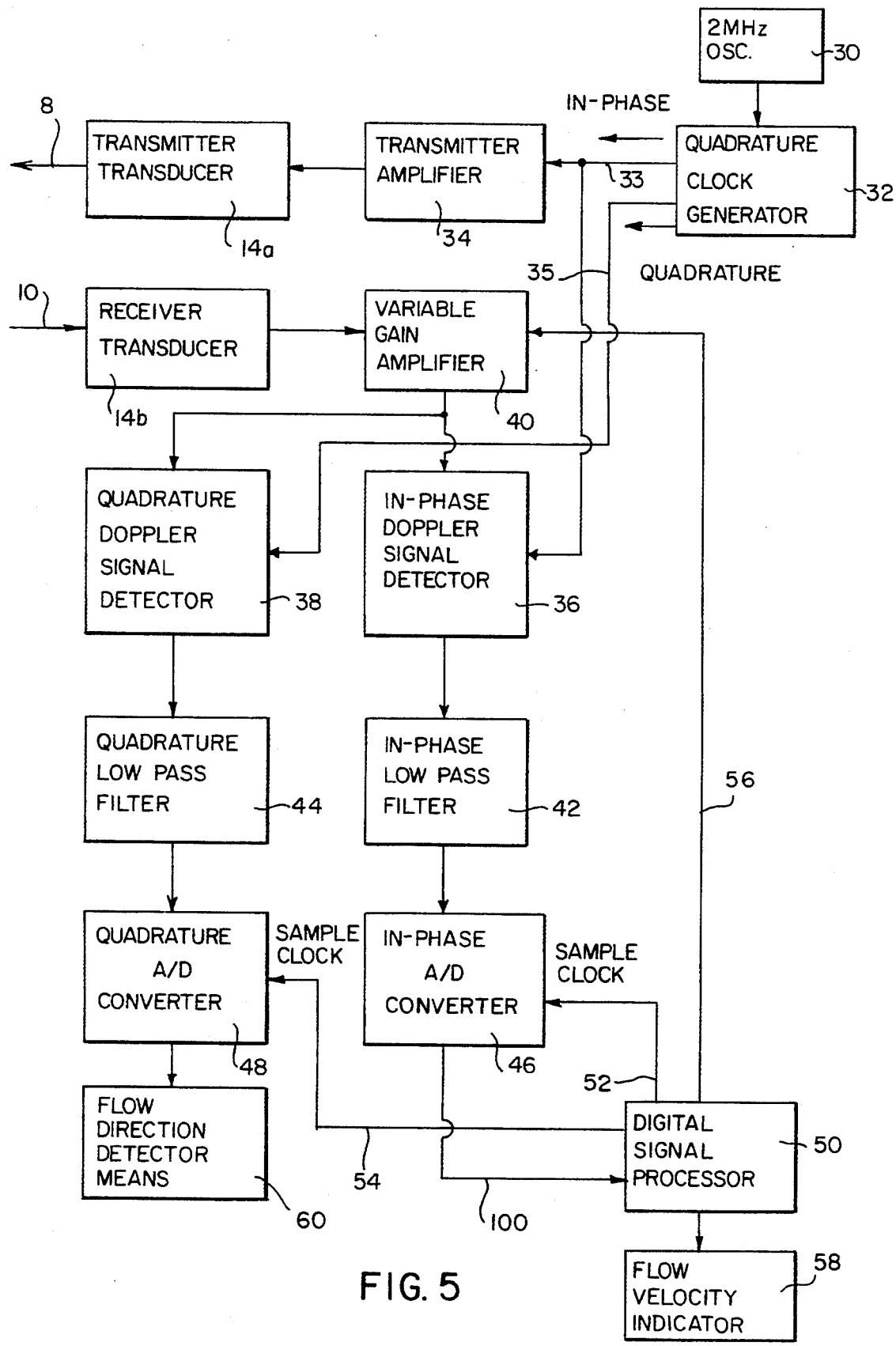
FIGS. 5 and 6 are a block diagram and an electrical schematic diagram of the flowmeter of the present invention.

Referring first more particularly to FIG. 1, the acoustic sensor transmitter/receiver Dopper velocity sensor 2 of the present invention is mounted in the bottom of conduit 4 which is partially or completely filled with liquid 6 the velocity of which is to be measured. The sensor is operable to transmit a beam 8 of acoustic or ultrasonic energy into the liquid, the beam being in the shape of a cone the axis of which lies generally colinearly with the axis of liquid flow. Particles of entrained air in the liquid, or turbulence in the liquid, reflect a portion of the incident energy back toward the sensor as shown by the arrow 10. Owing to the flow of the liquid and the particles entrained therein through the liquid, the reflected acoustic energy received by the sensor will be shifted by the Doppler effect according to the formula;

$$F_D = 2Vf_c \cos \Theta / C$$

where:

$F_D$ is the Doppler frequency in Hz;

V is the liquid velocity;

$f_c$ is the carrier frequency in Hz;

$\Theta$ is the angle sustained between the acoustic transducer axis and the direction of scatter velocity; and C is the acoustic speed of propagation in the liquid.

The sensor 2 includes a pair of transmitting and receiving transducers 14 (FIG. 2) each including a thickness-mode-resonant piezoelectric ceramic disk 16 mounted in one end of a brass cylinder 17 adjacent a quarter-wave acoustic transformer 19 which matches the acoustic impedance of the piezoelectric material to the water into which the incident energy is directed. In the illustrated embodiment, the brass cylinder 17, which serves as an electrical shield, has a diameter of about 0.375 inch and a length of about 0.75 inch. The casing is filled with a micro-balloon filed epoxy 18 which serves to dampen acoustic radiation out the backside of the element, and to provide a wide bandwidth. In one embodiment piezoelectric crystal consists of a ceramic lead-zirconate-titanate material such as PZT 5A having a resonating frequency of 1 MHz. The backing 18 comprises E & C 1090, and SEAMAX 9-38B polyurethane produced by Fluid Polymers Inc. comprises the fill between the transformer and the water. The transformer 19 comprises cast E & C 2850 MT epoxy.

Referring to FIGS. 3 and 4, the transmit and receive piezoelectric transducers 14a and 14b, respectively, are aligned so that their beam angles 14a' and 14b' overlap in the region 20 of the liquid to be investigated. The body 2a of the transducer assembly is of integral form containing longitudinal cavities for receiving the transducer elements, respectively. The voids 22a, 22b at the ends of the transducers are filled with a material (i.e., SEAMAX 9-38B that provides acoustic impedance matching to that of the water 6. The axes of both transmit and receiver transducers 14a and 14b have an elevation angle $\alpha$ that is determined by the velocity of the propagation of fill material relative to that of the water 6 according to Snell's Law. Typically, for a body face 2b having an angle $\beta$ of 30°, the elevation angle $\beta$ is about 5° to 6°. Electrical cables 24 and 26 electrically connect the transducers with the electronic circuit of FIG. 6, as will be described below. A liquid level sensor may be incorporated into the body 2a with the Doppler velocity transducers to for a flow sensor.

Figure 6:
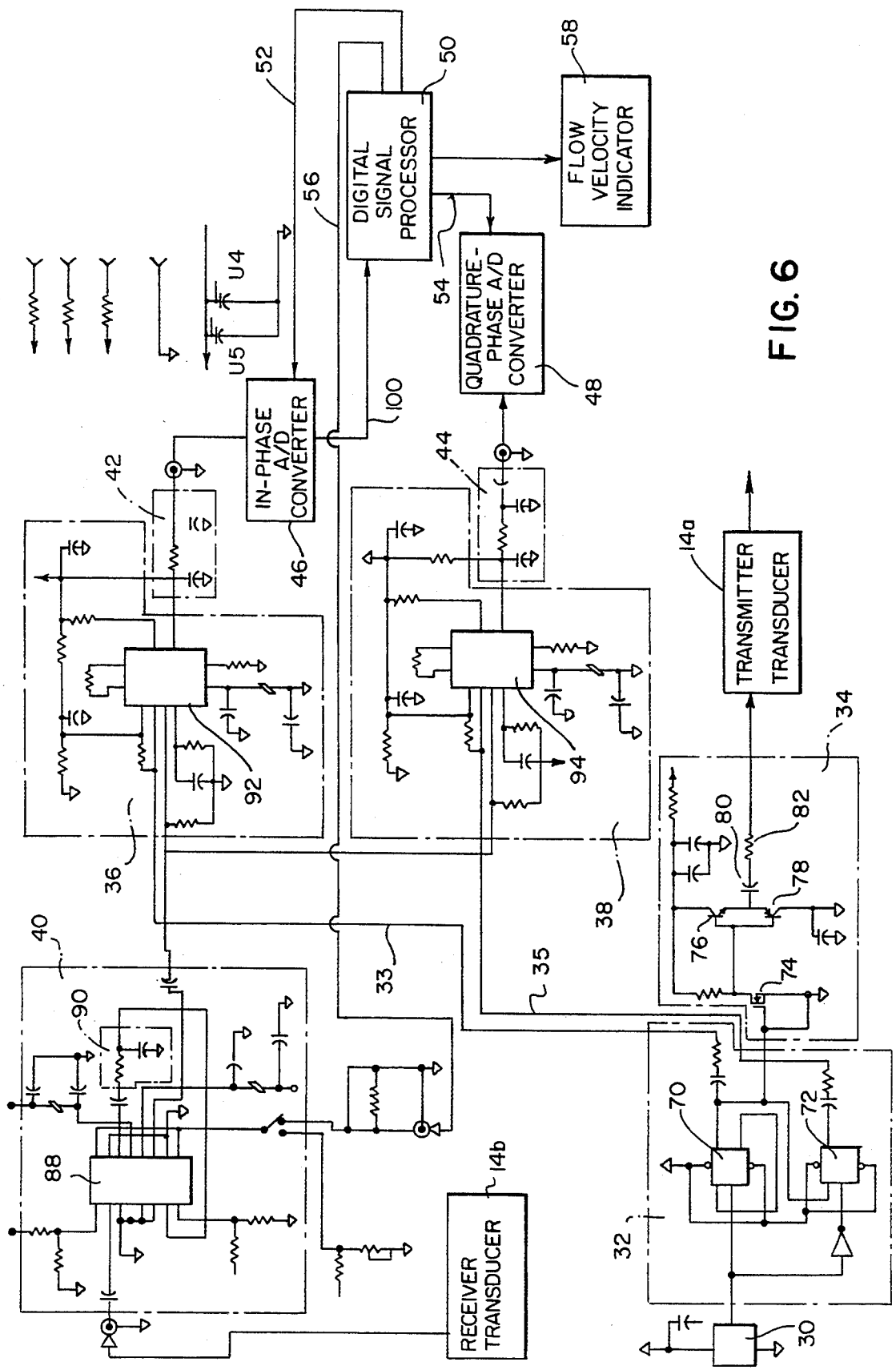

Referring now to FIGS. 5 and 6, the electronics circuit includes a 2 MHz oscillator 30 that drives a quadrature clock generator 32 that supplies in-phase clock signals to the transmitter amplifier 34 and the in-phase doppler signal detector 36. The quadrature clock signal is supplied via conductor 35 to the quadrature doppler signal detector 38. The transmitter amplifier 34 supplies the amplified signal to the transmitter transducer 14a that generates the transmitter beam 8. The reflected doppler beam 10 is received by the receiver transducer 14b, which produces an input control signal to variable gain amplifier 40. The output of the variable gain amplifier 40 is applied to the input terminals of both the in-phase Doppler signal detector 36 and the quadrature Doppler signal detector 38. The function of a Doppler signal detector in combination with properly designed anti-alias low pass in-phase and quadrature filters 42 and 44, respectively, is to provide an output that contains only the Doppler difference frequency (that is the difference in frequency between the signal scattered by the particles in the liquid and the signal transmitted by transducer 14a that is directed to the particles). The low pass filters are required since the output of each Doppler signal detector contains both the sum and difference frequencies of the signal present at the signal input and reference input of the Doppler signal detector. Since both of the Doppler signal detectors 36 and 38 have reference signals that are 90 degrees in phase reference to each other and both detectors have the same received signal, the Doppler difference output signals will also have an 90 degree phase relation. The direction of this 90 degree phase relation, or more particularly that signal which leads the other, may be employed to determine whether the moving particles are approaching the transducer or are moving away from it. Thus, the direction of the particle movement can be determined in this manner. The output of the anti-alias low pass filters 42 and 44 are directed to the in-phase and quadrature analog-to-digital converters 46 and 48, respectively. The analog-to-digital converters 46 and 48 are chosen to provide adequate resolution and must sample at a rate in accordance with sampling theory. The filters 42 and 44 pass only the low frequency Doppler information from the detectors and also insure that the analog-to-digital converters operate within the bounds of the Nyquist rate. The sampling clock is provided by the digital signal processer 50, and is supplied to the in-phase and quadrature analog-to-digital converters 46 and 48 via conductors 52 and 54, respectively. The digital signal processor 50 also supplies a voltage controlled control signal to the variable gain amplifier 40 via conductor 56. Flow velocity is indicated by the flow velocity indicator means 58 connected with the output of digital signal processor 50, and the output of the quadrature analog-to-digital converter 48 is supplied to the digital signal processor means 50.

Referring now to the electrical schematic diagram of FIG. 6, the 2 MHz clock oscillator 30 provides a square wave drive to the quadrature 1 MHz square wave generators defined by the 74HC74 D-flip-flop. The in-phase wave form is supplied to the transmitter amplifier 34 including an input field-effect transistor 74 following by an complimentary emitter follower pair of bipolar transistors 76 and 78 that are connected with the transmitter transducer 14a via a 0.1 mfd capacitor 80 and an 18$\mu$H series tuning inductor 82. The circuit provides about a 10 volt peak-to-peak drive to the transmitter transducer 14a. The 0.375 inch transducers potted with SEAMAX polyurethane present an impedance of 150 ohms at $-70$ degrees at 1.0 MHz. The measured Q is about 4 to 5 and the acoustic total beam angle is about 10 degrees to 3 dB, and 28 degrees to the null points. The elevation angle for a 30 degree sensor face is about 3 degrees (as compared to about 5 degrees calculated from Snell's law). With this drive, the power dissipated in the transmit disc is about 53 mW which is limited to the maximum of 100 mW. The capacitor 80 protects the transistor 76 against a short circuit output. A portion of the in-phase square wave signal (about 0.2 volts peak-to-peak) is applied to the in-phase Doppler detector 36 via conductor 33, and a portion of the quadrature-phase square wave is applied to the quadrature Doppler detector 38 via conductor 35.

The received Doppler signal is supplied from the transducer receiver 14B to the variable gain amplifier 40 which includes an AD600 component 88, the variable gain amplifier being voltage controlled by the output of the digital signal processor 50 via conductor 56. The two amplifier sections of AD600 are cascaded through a series RC low pass filter 90 having a corner frequency of about 7 MHz. The low pass filter 90 includes a 100 ohm resistor and a 470 pF capacitor. This stage provides gain from about 10 dB to 70 dB.

Doppler signal detection is performed by the MC1496 detectors 92 and 94 of the Doppler detector circuits 36 and 38 in combination with the low pass filters 42 and 44, respectively. The in-phase doppler signal detector 36 is employed for a velocity estimation, and the quadrature detector 38 serves to provide flow direction sensing information. The low pass filters 42 and 44 supplied by the outputs of the in-phase and quadrature detectors, respectively, provide a corner frequency of about 100 KHz, the output of the in-phase Doppler signal being applied to the A/D converter 46 for further digital signal processing.

Figure 13:
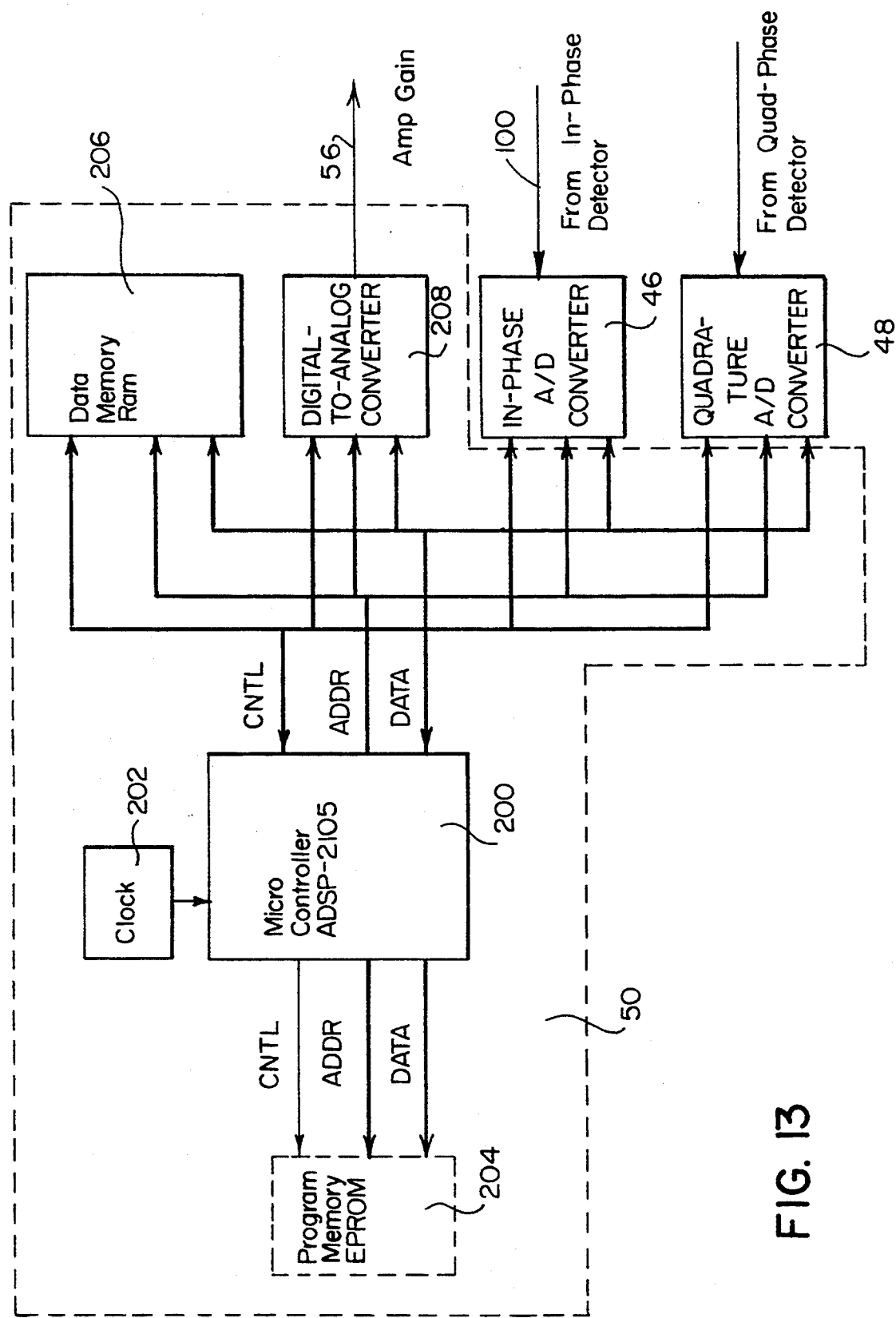
FIG. 13 is a block diagram of the digital signal processing means of FIG. 5.

The digital signal processor 50 analyzes the in-phase Doppler signal supplied from the in-phase analog-to-digital converter via conductor 100. Referring to FIG. 13, the digital signal processor is preferably of the general purpose computer type employing signal processing software, such as Labview produced by National Instruments. The processor 50 (FIG. 13) includes an ADSP-2105 micro-controller 200 supplied with a clock signal by clock 202, a program memory EPROM 204, a data memory ram 206, and a digital-to-analog converter 208 for producing the analog gain control signal supplied to variable gain amplifier 40 via conductor 56.

Figure 8:
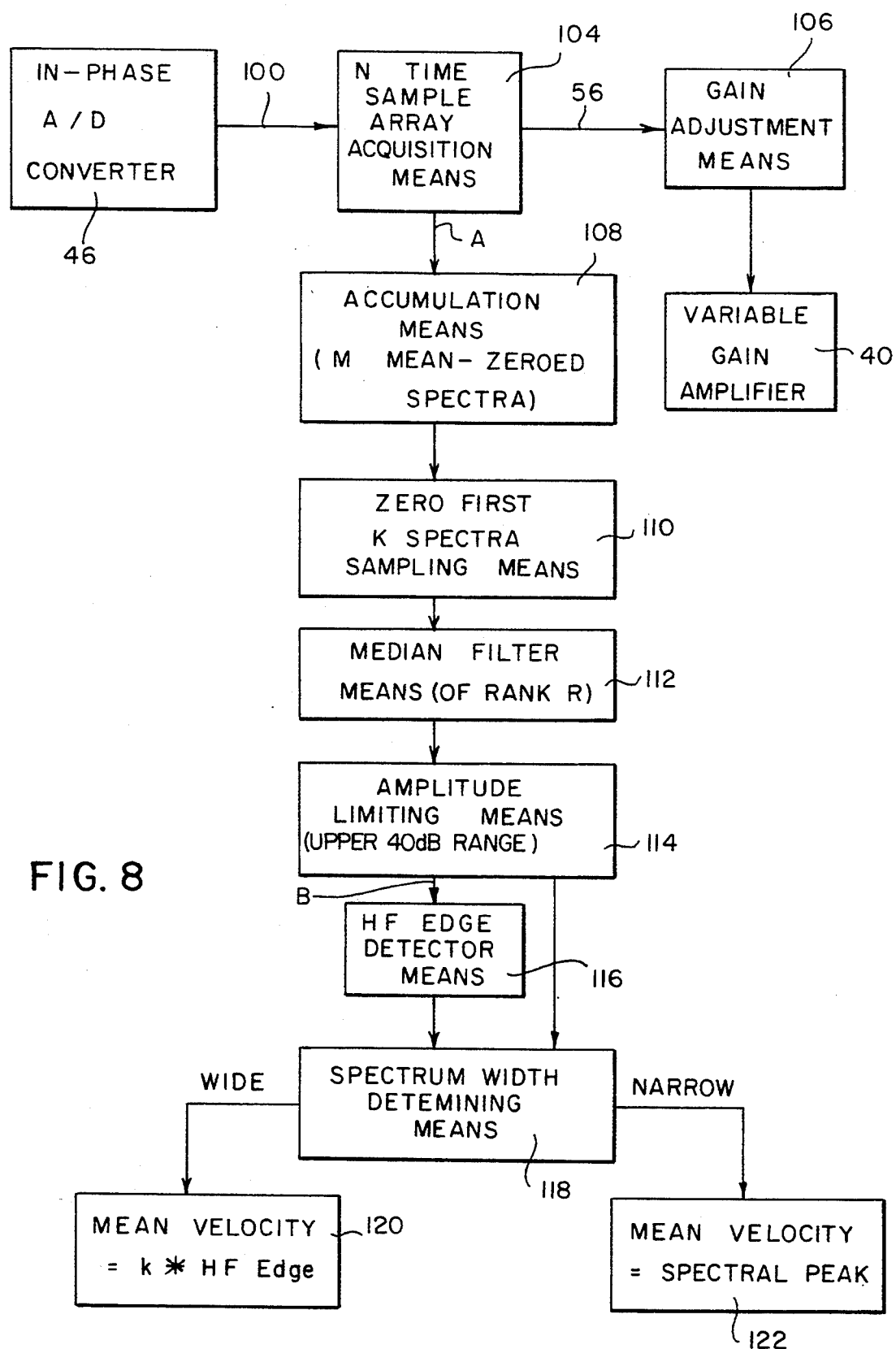
FIG. 8 is a flow diagram illustrating the operation of Doppler and signal processing means.

Referring now to FIG. 8, the Doppler signal processing is as follows:

(1) a digitized array of N samples is acquired by acquisition means 104 from the output of the in-phase Doppler signal detector;

(2) the gain of the variable gain amplifier by gain adjustment means 106 is adjusted via conductor 56;

(3) M zeroed-mean power spectra of the Doppler signal are acquired and accumulated by accumulator means 108, each from a newly acquired sampled array from the in-phase Doppler signal detector;

(4) the first K elements of the accumulated spectra are zeroed by the sampling means 110, (5) the accumulated spectra are passed through a median filter 112 of rank R;

(6) the amplitude range of the filtered spectra is limited by limiting means 114 to between the maximum and about 40 dB down from maximum value;

(7) the best estimate of the high frequency edge of the filtered spectra is determined by HF edge detector means 116 by the use of an HF Edge Algorithm, as described below;

(8) based on the results of the HF Edge Algorithm and the frequency or velocity of the peak spectral amplitude, a determination by spectrum width determining means 118 is made as to whether the spectrum is of narrow or wide bandwidth, use being made of a Narrow/Wide Band Detector Algorithm, described below; and (9) if the spectrum band is wide, then the estimated flow velocity 120 is determined as a function of a multiple of the high frequency edge, and if the spectrum band is narrow, the frequency of the maximum (peak) spectral component is the estimated velocity 122. The aforementioned multiple of the high frequency edge is a function of liquid depth when normalized to pipe diameter. For narrow bandwidth, the flow velocity determined from the peak may also be adjusted by a function of normalized depth.

It is known that Doppler Frequency is related to particle velocity by a constant factor:

$$\frac{C/2}{f_c \times \cos\theta} = K_D$$

where:
C = 4922 fps
fc = 1.0 MHz (carrier frequency)
Θ = 3° (acoustic beam elevation angle)
$K_D$ = 2.46 e$^{-3}$ fps/Hz The gain of the variable gain amplifier 40 is set by the digital signal processor 50 by adjusting the control voltage so that the maximum values of the digitized Doppler signal fall within approximately the upper 3 dB of the A/D range. This may be carried out as a separate operation just before acquiring the M spectra, in order to simplify operation.

The number of samples N in the time domain waveform array is by example 4096 and the sampling frequency 20 K Samples/Sec. This results in a velocity resolution of about 0.01 fps. The number of samples may be restricted to an integral power of 2 in order to employ a FFT. In the preferred embodiment, power spectra are employed but other forms of spectral estimation may be employed. A number M of preferable zero meaned spectral arrays, each from N newly acquired time domain samples are accumulated to form the resulting real valued power spectra. A value of 8 for M has been utilized. The first K spectral samples of the resulting spectra are forced to zero. This is done to suppress surface related velocity noise components. A value of 8 has been established for K in the preferred embodiment. The resulting minimum possible detected velocity is about 0.01 fps.

The resulting accumulated spectrum is passed through a median filter of rank R. This is a nonlinear filter that combines lowpass filtering while preserving edge information. A rank of 2 has been found to be effective with both laboratory and field data, but higher order filters are also effective. Specifically, for a rank of 2, this filter outputs the median at index i for a subset of the input sequence:

$$\{X_{i-2}, X_{i-1}, X_i, X_{i+1}, X_{i+2}\}$$

After filtering, the spectrum is limited to approximately the upper 40 dB of its dynamic range. This is done to prevent false edge detection from occurring due to high frequency noise components. Other values of dynamic range may also be effective. With reference to FIGS. 7 and 8, time domain waveform A represents a digitized array of a portion the Doppler difference signal at point A of FIG. 8, and waveform B represents the resulting spectrum at the point B of signal processing shown in FIG. 8. Actual spectra at point B from flow laboratory experiments are shown in FIGS. 9a-12a.

The HF Edge Detection Algorithm will now be described. Inputs include the limited spectrum waveform B, and an integer value called the Decimate Factor. Experimentally the Decimate Factor has been set to 50. The general operation is as follows with reference to FIGS. 9-12:

(1) The spectrum array is decimated by Decimate Factor. The elements of the Decimated Array (DA) 130 are the average values of the samples contained between the decimation indexes of the full spectral array 132.

(2) An array, Cell Ratio Array 134, is formed of the ratios of the adjacent values from the Decimated Array 130. A large value of one of these elements indicates an edge in the spectrum. The length of this array in the preferred embodiment is 40 samples for a full spectrum length of 2048 samples and a decimation factor of 50.

Mathematically this operation may described as:

$$\text{Cell Ratio}_j = \frac{DA_j}{DA_{j+1}} \text{ for } j = 0 \ldots N - 1$$

(3) The index along the full spectrum where the Maximum-Cell-Ratio 140 occurs is utilized to select a sub-array 142 of the full spectrum in which the high velocity edge 144 occurs. A fine grain search is conducted in that subarray 142. Since it is possible that a false High Frequency Edge may exist because of large low velocity noise, a qualification is done if the maximum Cell-Ratio 140 occurs in the first cell of the decimated array 130 as follows:

If the Maximum-Cell-Ratio 140 occurs for j=0
Then, if ($DA_0$/Max of all other $DA_j$)>10, then Index-Max 146=0
Else Index-Max 46=index of the Cell Ratio Array Element with the second most largest value.

Figure 9A:
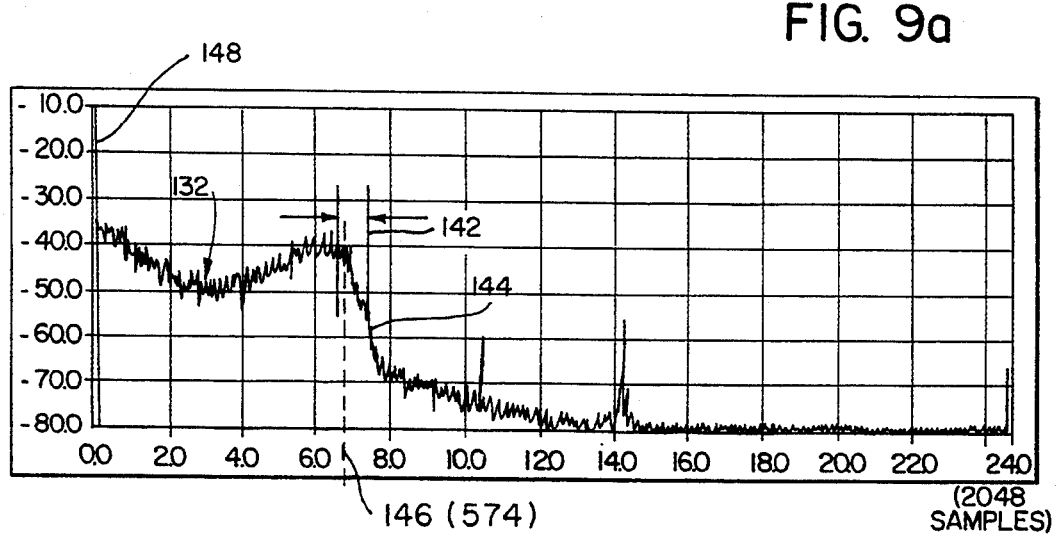
FIGS. 9a-11c are sampling graphs illustrating three examples of wide band Doppler signal processing.
Figure 9B:
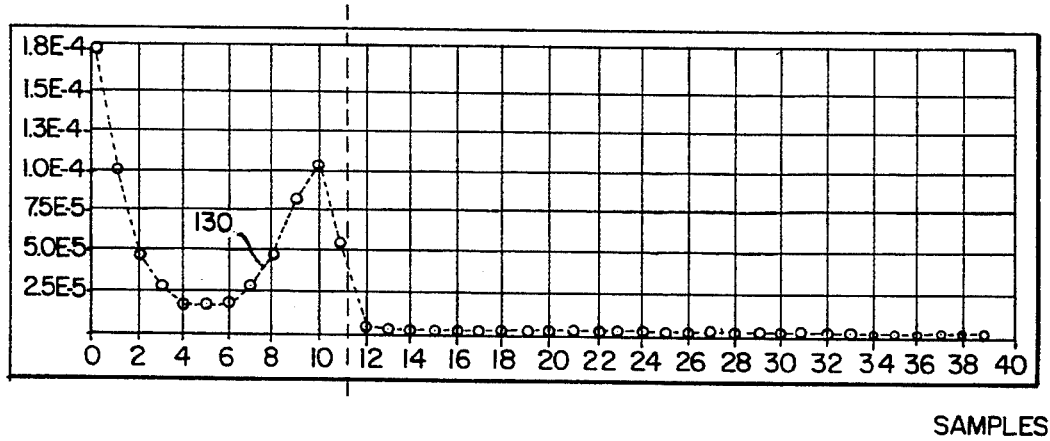
Figure 9C:
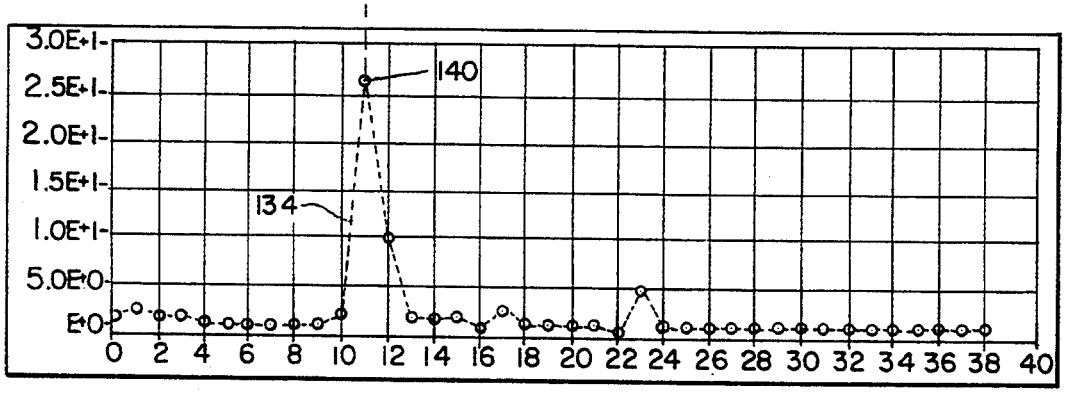
Figure 10A:
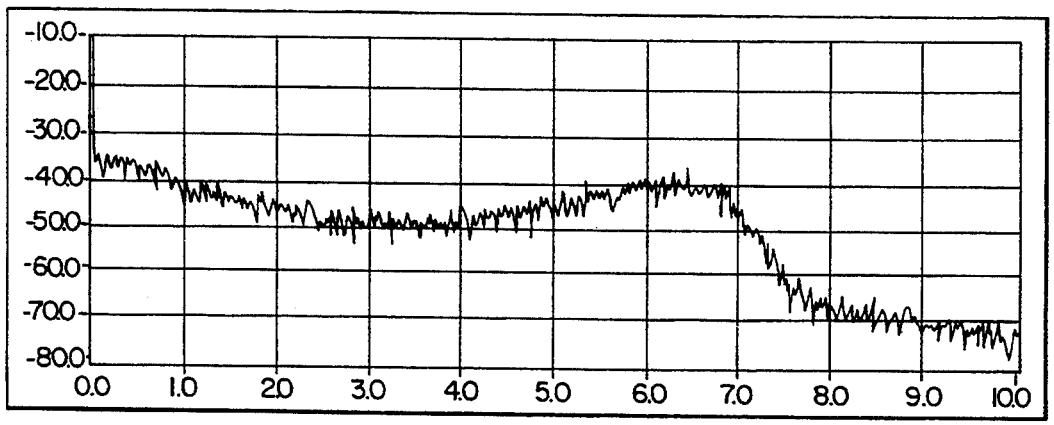
Figure 10B:
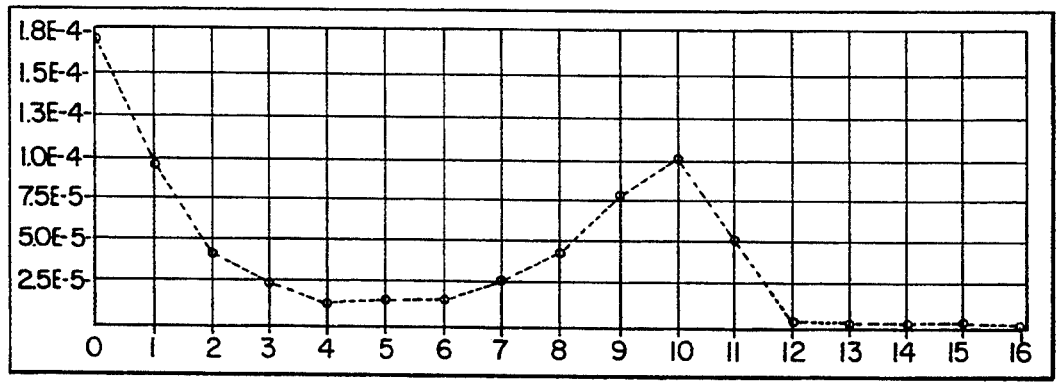
Figure 10C:
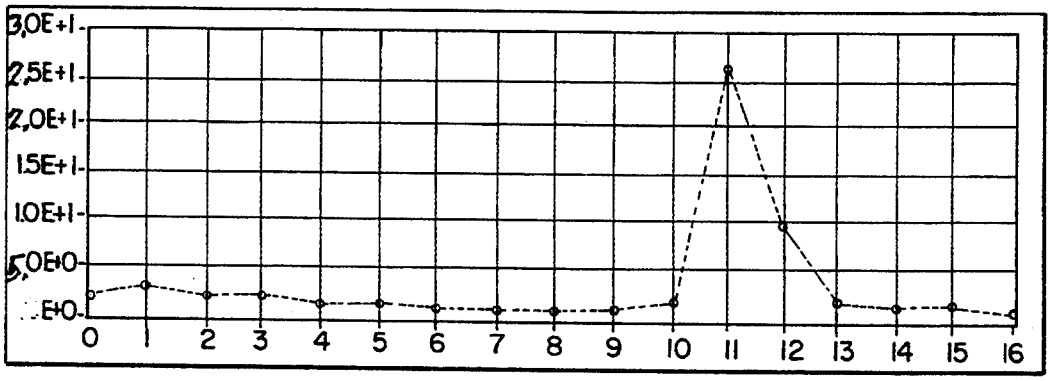
Figure 11A:
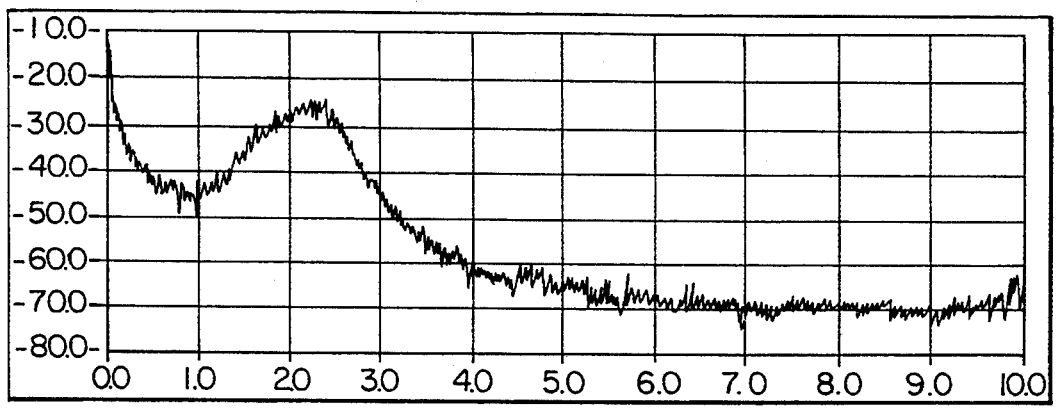
Figure 11B:
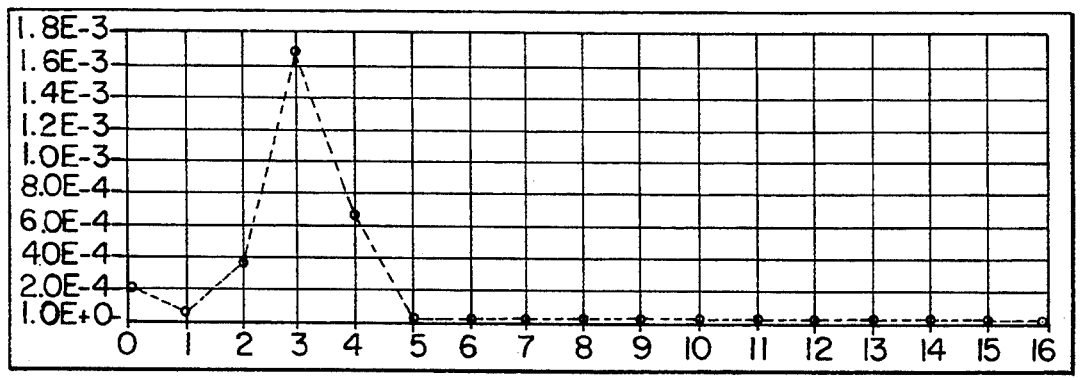
Figure 11C:
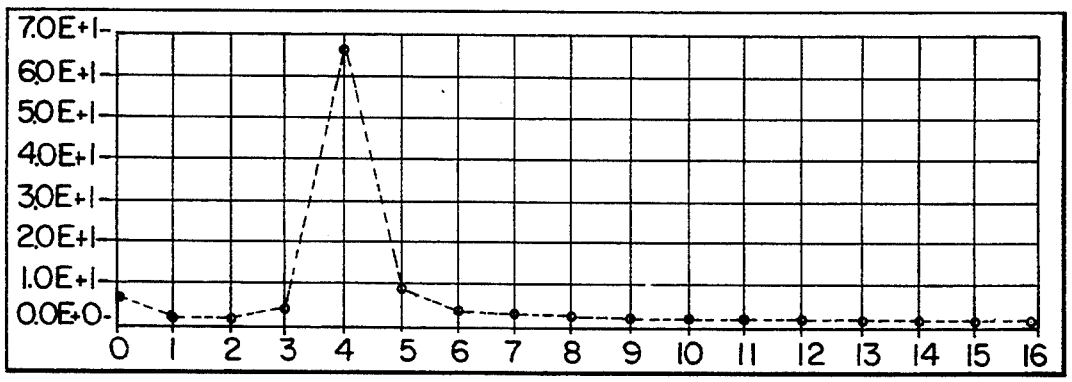
Figure 12A:
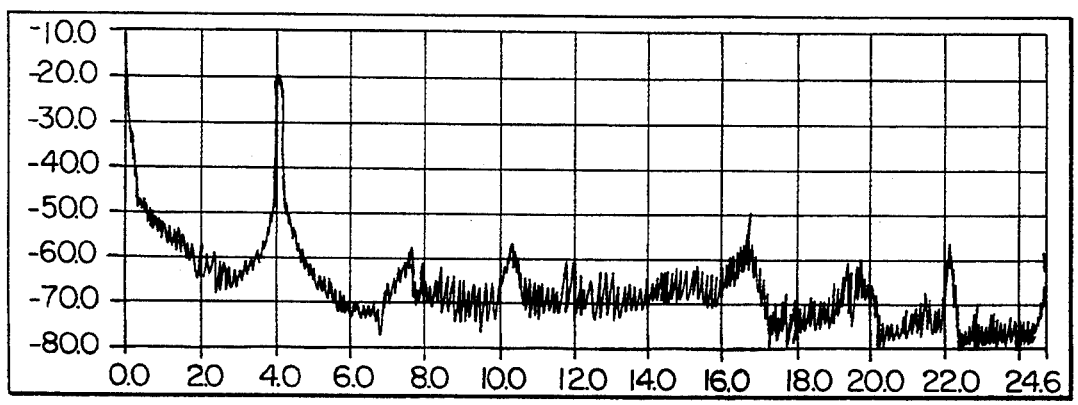
FIGS. 12a-12c are sampling graphs illustrating an example of narrow band Doppler signal processing.
Figure 12B:
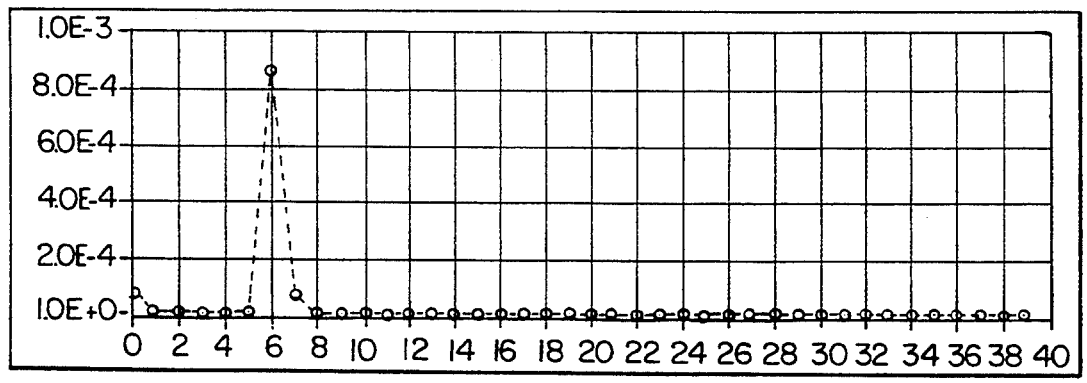
Figure 12C:
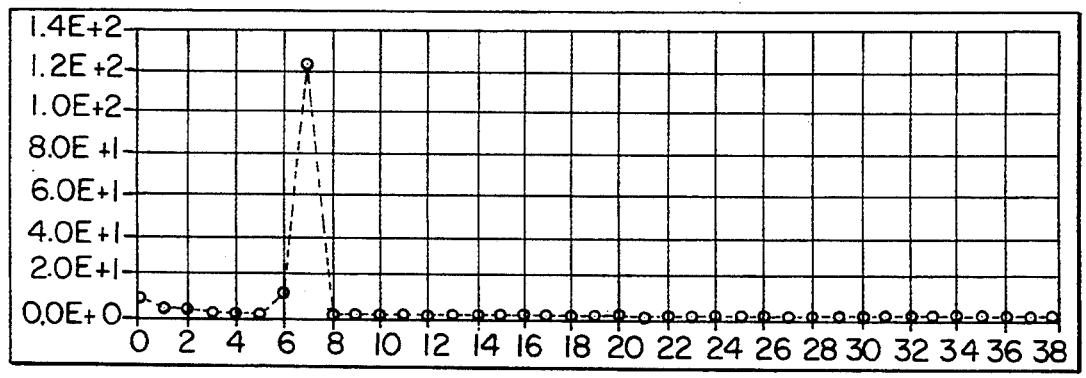

(4) The index number 146 for the sub-array of the full spectrum in which the high velocity edge occurred is determined. As shown in FIG. 9a, the index value is approximately 574 for the particular data shown. The lower index is reduced by 20 since the fine grain search for the edge employs averages of 20 spectral elements in the preferred embodiment.

$$Index_{Low} = (Index\ Max \times Decimation\ Factor) - 20$$

A sub-array 142 from the full spectrum 132 is formed from this index and of length as shown below: The length is rounded to the nearest integer. The value is 71 for the preferred embodiment.

$$Length = Int(Spectral\ Length \div Size\ Decimated\ Array + 20.5) = 71$$

(5) The index of the High Frequency Edge 144, in the context of the full spectrum 132 is located by forming an array with elements equal to the difference between the sum of the 20 elements below the current index and the sum of the 20 elements above it. The index of the High Frequency Edge 144 is the index of the maximum value of this difference array.

(6) The Decimated Array 130 samples and the Index-Max 146 are output for use by the Narrow/Wide Band Detector algorithm described below.

The peak amplitude of the full spectrum 132 and the velocities at which it occurs is determined from the filtered spectrum. In cases where the spectrum is of narrow bandwidth, such as when the sensor is towed, a more accurate estimate of velocity is the peak of the velocity spectrum. For a wide band spectrum, as is the case for normal pipe or open channel flow, velocity is most accurately estimated to be a fraction of the High Frequency Edge 144 converted to units of velocity. A decision function, Narrow/Wide Detection Algorithm is described as follows:

(1) Choose the larger element from the Decimated Array 130 of either that with an index where the maximum ratio occurred, Index-Max, or the element just below it. The result is identified as Max-Value.

(2) Compare this maximum value to that of all elements of the Decimated Array 130 with lower valued indexes.

(3) Form an array with elements equal to the Max-value divided by each element of the Decimated Array with an index less than that of the Max-Value. If the minimum value of the resulting array<10 OR Index-Max=0; Then Bandwith is Wide, Else is Narrow.

While the preferred forms and embodiments have been illustrated and described, it will be apparent that changes and modifications may be made without deviating from the inventive concepts set forth above.

What is claimed is:

1. A method for measuring the velocity of flow of a fluid in a conduit, comprising;
    (a) transmitting a beam (8) of acoustic energy of a given frequency into the fluid;
    (b) receiving a beam (10) of acoustic energy reflected by the fluid;
    (c) detecting the in-phase reflected Doppler signal;
    (d) filtering the in-phase reflected Doppler signal by a low-pass anti-alias filter (42) to produce a filtered signal;
    (e) converting the filtered analog signal to a digital signal that is sampled at a given sampling rate, thereby to produce a sampled array;
    (f) accumulating a first number (M) of mean-zeroed power spectra from the sampled array;
    (g) zeroing a second number (K) of the initial samples of the power spectra, thereby to produce a first modified spectra;
    (h) passing said modified spectra through a median filter of given rank (R), thereby to produce a second modified spectra;
    (i) limiting said second modified spectra to produce samples limited to the upper portion of a range of amplitudes, thereby to produce a third modified spectra;
    (j) determining the high-frequency edge of the third modified spectra;
    (k) determining from the third modified spectra and the high-frequency edge whether the third modified spectra has a narrow band width or a wide band width; and
    (i) converting said third modified spectra as a function of either said narrow band width or said wide band width to produce an estimate of mean velocity.

2. The method as defined in claim 1, wherein said third modified spectra has a wide band width, and further wherein said mean velocity estimate is obtained as a multiple of said high frequency edge.

3. The method as defined in claim 1, wherein said third modified spectra has a narrow band width, and further wherein said mean velocity estimate is directly proportional to the spectral peak of said high frequency edge.

4. The method as defined in claim 1, wherein the determining of the high-frequency edge of the third modified spectra includes:
    (1) decimating said third modified spectra by a fourth number to produce a resulting decimated array;
    (2) forming from the ratios of the adjacent values of said decimated array a cell ratio array;
    (3) detecting the index location of the maximum value of the cell ratio array;

(4) selecting a subarray of said third modified spectra in accordance with said index location;

(5) averaging a fifth number of samples within said subarray below each index point to produce a averaged lower value;

(6) averaging said fifth number of samples within said subarray above each index point to produce an averaged upper value;

(7) obtaining the difference between said lower and upper values to obtain a difference array, whereby the point at which the maximum value of the difference occurs defines the high frequency edge.

5. The method as defined in claim 4, wherein the analyzing of the third modified spectra and said high-frequency edge includes:

(1) selecting the larger element of said decimated array of the index location where the maximum call ratio array occurs and the index location just below said maximum call ratio array location;

(2) producing an array with elements formed from the ratio of the larger of two values and each respective element of the decimated array with an index less than that of the location of the larger element; and (3) choosing the minimum value of said resulting array to detect a wide band width condition, whereby in the absence of the detection of a wide band width condition, the third modified spectra has a narrow band condition.

6. The method as defined in claim 5, wherein said minimum value of said resulting array is less than 10.

7. Apparatus for measuring the velocity of flow of fluid in a conduit, comprising:

(a) means (14a) for transmitting a beam (8) of acoustic energy of a given frequency into the fluid;

(b) means (14b) receiving the reflected Doppler portion (10) of said beam that is reflected by the fluid;

(c) means (36) for detecting the in-phase component of the reflected Doppler signal;

(d) anti-alias filter means (42) for filtering said in-phase component to produce a filtered signal;

(e) analog-to-digital converter means (46) for converting said filtered signal at a given sampling rate, thereby to produce a sampled array;

(f) accumulation means (108) for accumulating a first number (M) of mean-zeroed power spectra from the sampled array;

(g) sampling means (110) for sampling a second number (k) of the initial samples of the power spectra, thereby to produce a first modified spectra;

(h) median filter means (112) of rank (R) for passing the modified spectra to produce a second modified spectra;

(i) limiting means (114) for limiting said second modified spectra to produce samples limited to the upper portion of a range of amplitudes, thereby to produce a third modified spectra;

(j) means (116) for determining the high-frequency edge of said third modified spectra;

(k) determining means (118) for determining whether said third modified spectra has a narrow band width or a wide band width;

(l) means (120) responsive to a determination of a wide band width of said third modified spectra for providing an estimate of means velocity; and (m) means (122) responsive to a determination of a narrow band width of said third modified spectra for providing a second estimate of mean velocity.

8. Apparatus as defined in claim 7, wherein said beam transmitting and receiving means include a sensor body (2) adapted for mounting on the bottom wall of said conduit, said sensor body having a longitudinal axis parallel with the longitudinal axis of said conduit, said body having at one end an inclined face (2b) containing a pair of longitudinal bores, signal transmitter and receiver devices (14a, 14b) mounted within said bores, respectively, and energy transmissive means (22a, 22b) closing the free ends of said bores, thereby to maintain said transmitter and receiver devices in said bores.

* * * * *